INVENTOR.
NORMAN A. FREYTAG

United States Patent Office 3,509,314
Patented Apr. 28, 1970

3,509,314
WIRE FEED CONTROL FOR AN AUTOMATIC WELDING SYSTEM
Norman A. Freytag, Ambler, Pa., assignor to The Budd Company, Philadelphia, Pa., a corporation of Pennsylvania
Filed Apr. 26, 1967, Ser. No. 633,924
Int. Cl. B23k 9/10
U.S. Cl. 219—131      5 Claims

ABSTRACT OF THE DISCLOSURE

Means are attached to a welding gun to develop a voltage relating to the speed of the welding gun. The output voltage is converted to an appropriate form and applied to a motor to control the feed rate of a consumable electrode in accordance with the velocity of the welding gun.

---

The form and quality of the weld in consumable electrode arc welding depends on a large number of variables, including welding current, voltage, arc length and other factors. The terminal length of electrode is commonly referred to in the welding industry as "stick-out." It is virtually impossible to maintain these variables absolutely constant. Consequently even an acceptable weld produced is seldom completely uniform.

A commonly employed control system utilizes a consumable wire feeding system that feeds wire at a rate proportional to arc voltage. This system is used where the welding power supply is of the so-called drooping characteristic type, i.e., the voltage decreases as the current increases. If the spacing between the welding tool and the workpiece decreases, the arc becomes shorter and the arc voltage drops. A reduction of the wire feed rate results and establishes a new equilibrium condition having different wire feed, voltage and stick-out values from those that existed prior to the shortening of the arc distance.

Another popular form of consumable electrode welding control includes a welding power supply which maintains a substantially constant output voltage over its operating current range. The consumable electrode wire is fed at a constant rate independent of the welding process variables in the system. If the spacing between the electrode and the workpiece is reduced, the current rises to increase the wire burnoff rate and to re-establish the equilibrium condition where the total welding voltage is the same as previously but the values of current, arc length and stick-out are different from the values that existed prior to the change in spacing. A change in the weld produced results because the welding current, and stick-out are interrelated. Neither of the two systems mentioned take into account variations in the speed of the welding gun during operation.

While such systems have generally proved satisfactory under uniform travel speed conditions, they result in less than satisfactory performance when the rate of speed of the welding gun varies for a given set of welding conditions such as current, voltage, wire feed and stick-out but with a variable travel speed. A high travel speed will result in a weld with too little filling while too slow a travel speed will result in too much filling for optimum joint conditions.

As is well known, in welding operations there must generally be a predetermined amount of weld metal deposited per unit length of weld to produce a uniform weld appearance as well as a satisfactory weld from a quality point of view.

It is an object of this invention to provide an improved wire-feed welding system.

It is a further object of this invention to provide an improved wire-feed welding system to provide substantially the same quality welds for different speeds of a welding gun.

It is still a further object of this invention to provide an improved wire feed welding system to provide substantially the same quality welds for different speeds of a welding gun for wires of different diameters and for welds of different thicknesses.

In describing the subject invention, emphasis will be directed towards the invention with many details relating to prior art systems omitted because such systems are well known to those skilled in the art. One such wire control system is illustrated in a Patent 3,109,121.

In accordance with the present invention, a welding gun feeds a consumable wire electrode to a workpiece by means of an electric motor. An accelerometer produces electrical signals representative of the acceleration of the welding gun. The electrical signals are converted to an appropriate form and then applied to control the rate of feed of the wire electrode in accordance with the velocity of the welding gun.

Other objects and advantages of the present invetnion will be apparent and suggest themselves to those skilled in the art, from a reading of the following specification and claims, in conjunction with the accompanying drawing in which:

In determining the rate of speed at which a consumable wire electrode must be fed in connection with a particular workpiece, various factors must be considered. For example, the thickness of the weld desired and the diameter of the wire must also be considered. In considering all the various factors, it is desirable that the welding operation be terminatetd in the event that the operation is proceeding too fast or too slow to produce an acceptable weld.

Figure 1:
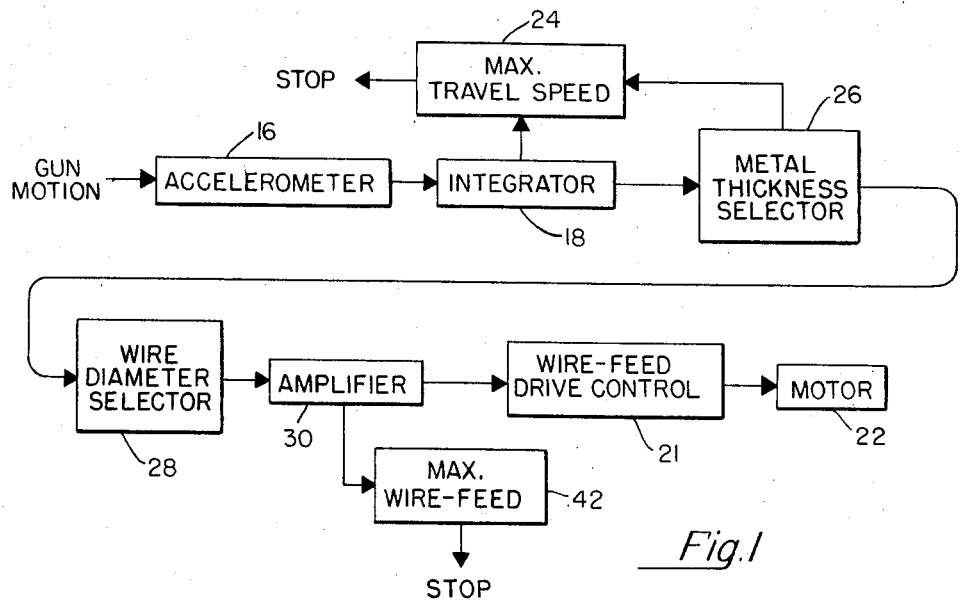
FIG. 1 is a block diagram illustrating a welding system, in accordance with the present invention.

Referring to FIG. 1 of the drawing, a welding gun 10 is disposed to be moved along a joint to be welded of workpieces 12 and 13 to produce a weld 14. A linear accelerometer 16 is physically mounted to the welding gun 10 to develop a voltage representative of the acceleration of the welding gun 10 as it moves during the welding operation.

The output voltage from the accelerometer 16 is applied to an integrator circuit 18. The integrator circuit 18 builds up a voltage dependent upon the acceleration of the welding gun 10. Such integrator circuit may include a circuit having a capacitor resistor network or other well known integrator type circuits. The signal from the integrator 18 is applied to a control box 20 which may include circuitry for generating control voltages relating to weld thickness, wire diameter and other functions relating to weld operation. The control box 20 may include appropriate circuitry for combining various voltages to produce a combined voltage which is ultimately used to control the feed rate of the wire electrode. The output signal from the integrator 18 may be applied to a detector 24 which compares the voltage from the integrator with a reference signal indicative of a maximum travel speed beyond which it is impossible to produce an acceptable weld. If the travel speed exceeds a predetermined amount a stop signal is produced to stop the welding operation. This maximum speed is dependent upon the thickness of the weld to be made. Therefore, the output signal from the thickness selector 26 is also applied to the maximum speed control circuit 24.

The signal from integrator 18 is combined with signals representing the metal thickness and the wire diameter. A metal thickness selector 26 produces a signal at a predetermined voltage level and the wire diameter selector 28 produces a signal at a predetermined voltage level with both signals being combined with the signal from the integrator 18. The diameter selector is necessary because the amount of thickness of the wire is related to the amount of deposited weld metal for a given rate of wire feed.

The combined signals from the integrator circuit 18, the metal thickness selector circuit 26 and the wire diameter selector circuit 28 are combined and applied to an amplifier 30. The output signal from the amplifier 30 is applied to a wire feed control circuit 21, which drives the motor 22. All of the aforementioned circuitry may be included in the control box 20. Additive circuits for combining different signals are well known to those skilled in the field. Because such circuits are only incidentally related to the subject invention, they are not shown or described in detail.

The motor 22 (FIG. 2) is connected to a gear box 32 having an output roller 34 to frictionally engage a wire 36 along with a second roller 38. The output signal is also applied to a detector circuit 42. This detector circuit compares the voltage from the amplifier 30 with a reference voltage representing a maximum feed rate. If the voltage from the amplifier 30 exceeds the maximum safe level, a stop signal is produced to stop the welding operation.

The wire 36 is fed from a reel 40 through the gun 10 so that its end is in close proximity to the workpieces 12 and 13. A voltage from a direct current source 50 is applied to produce the arc between the end of the wire 36, which acts as one electrode and the workpiece 12 which acts as the other electrode.

Figure 2:
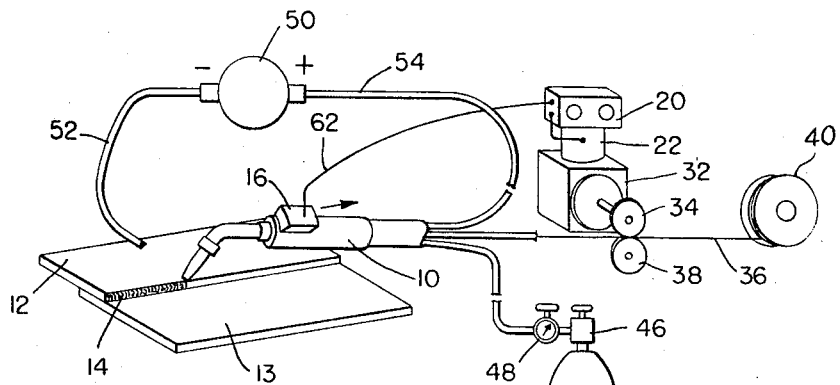
FIG. 2 is a view illustrating the main feature of the subject invention.
Figure 3:
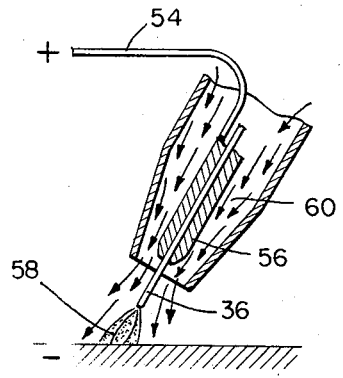
FIG. 3 is an enlarged view of the welding gun of the type which may be used in the subject invention.

Referring to FIGS. 2 and 3, in one embodiment as illustrated, the negative output lead 52 is connected to the workpiece 12 and the positive lead 54 is connected to a tubular element 56 which surrounds and is electrically connected to the wire 36. The voltage applied to the wire 36 and the workpiece 12 causes an arc 58 to be produced. This in turn causes the wire 36 to melt thereby forming the weld 14. The shielding gas 60 prevents the workpiece 14 from being exposed to the atmosphere during the operation. Of course, it is apparent that various other electrical arrangements may be employed in addition to the one illustrated.

It is noted that the signal controlling the wire feed motor represents the velocity of the welding gun. For convenience, an accelerometer is used to first generate a voltage representative of the acceleration of the gun. This voltage is converted to an appropriate form to produce an output signal representing the velocity of the gun. It is apparent that tachometers or other suitable means could also have been used to generate a signal representing the velocity of the gun. Accelerometers are convenient because they do not require any fixed reference points or levels. The accelerometer 16 which may be a linear accelerometer produces an output signal which is applied through a lead 62 to the control box 20 which includes the integrator circuit. If the welding path is other than a straight line, two or more accelerometers may be employed to produce different integrated voltages for different directions of movement of the welding gun 10. The output voltages from the two or more accelerometers may be combined in suitable fashion to provide the proper variable wire feed of the wire 36. Compensation in this case provides variable feed control for changes in speed taking place in the direction of the gun movement.

It has been seen that the subject invention has provided a relatively simple control means which may be used to implement prior existing systems. It is noted that the subject invention is not intended to substitute for many of the features of prior art systems involving arc voltage and current detection to control various functions in the welding operation. The subject invention has provided an additional means to supplement means already in existence to compensate to some extent for the many variables in a welding system.

What is claimed is:

1. Welding apparatus for utilizing a consumable wire electrode to produce a weld on a workpiece comprising a welding gun adapted to be moved along a path to be welded, control means including a motor for feeding said consumable electrode toward said workpiece as said welding gun is moved, said control means further including means for producing signals representative of the thickness of said workpiece and diameter of said wire electrode, means including an accelerometer attached to said welding gun for detecting the speed of said welding gun to produce control signals, means for combining the signals representative of said thickness of said workpiece and diameter of said wire electrode to produce combined signals, and means for applying said combined signals to said control means to control the feed rate of said consumable electrode to compensate for variations in speed of said welding gun as it is moved.

2. Welding apparatus for utilizing a consumable wire electrode to produce a weld on a workpiece comprising a welding gun adapted to be moved along a path to be welded, control means including a motor for feeding said consumable electrode toward said workpiece as said welding gun is moved, means attached to said welding gun for detecting the speed of said welding gun to produce control signals, means for varying said control signals in accordance with the thickness of said workpiece and diameter of said wire electrode, and means for applying said varied signals to said control means to control the feed rate of said consumable electrode to compensate for variations in speed of said welding gun as it is moved.

3. The invention as set forth in claim 1 wherein stop signals are produced to stop the welding operation when the speed of said welding gun exceeds a predetermined limit.

4. The invention as set forth in claim 3 wherein an integrator circuit is associated with said accelerometer.

5. The invention as set forth in claim 4 wherein an arc is produced by said welding gun between said wire and said workpiece and means for producing a gas is employed to protect said workpiece from the atmosphere during a welding operation.

References Cited

UNITED STATES PATENTS

| 1,278,982 | 9/1918 | Morton | 219—124 |
| 1,965,331 | 7/1934 | Chapman | 219—125 |
| 2,488,987 | 11/1949 | Schmerber | 219—131 |
| 2,950,431 | 8/1960 | Wright | 318—20.390 X |
| 3,286,074 | 11/1966 | Lehnert et al. | 219—131 |

JOSEPH V. TRUHE, Primary Examiner

J. G. SMITH, Assistant Examiner

U.S. Cl. X.R.

219—130